(12) United States Patent
Klein et al.

(10) Patent No.: US 7,618,465 B2
(45) Date of Patent: Nov. 17, 2009

(54) NEAR-FIELD ANTENNA

(75) Inventors: Norbert Klein, Jülich (DE); Filip Kadlec, Klecany (CZ); Petr Kuźel, Prague (CZ)

(73) Assignee: Forschungszentrum Julich GmbH, Julich (DE)

( * ) Notice: Subject to any disclaimer, the term of this patent is extended or adjusted under 35 U.S.C. 154(b) by 116 days.

(21) Appl. No.: 11/791,389

(22) PCT Filed: Nov. 19, 2005

(86) PCT No.: PCT/EP2005/012407

§ 371 (c)(1),
(2), (4) Date: Jan. 23, 2008

(87) PCT Pub. No.: WO2006/056373

PCT Pub. Date: Jun. 1, 2006

(65) Prior Publication Data

US 2008/0193752 A1  Aug. 14, 2008

(30) Foreign Application Priority Data

Nov. 22, 2004  (DE) .................. 10 2004 056 241

(51) Int. Cl.
*G01N 13/16* (2006.01)
*G12B 21/06* (2006.01)

(52) U.S. Cl. ............... 850/32; 850/1; 850/8; 850/10; 850/49; 850/58; 850/59; 850/30; 850/57; 250/306; 250/307; 250/310; 250/234; 250/201.3; 250/216; 250/227.26; 250/235; 428/364; 428/328; 428/131; 428/156; 73/105; 324/754; 385/38; 385/117; 385/118

(58) Field of Classification Search ............ 850/30, 850/1, 10, 8, 49, 58, 59, 32, 57; 250/306, 250/307, 310, 234, 201.3, 216, 227.26, 235; 428/364, 328, 131, 156; 73/105; 324/754; 385/38, 117, 118
See application file for complete search history.

(56) References Cited

U.S. PATENT DOCUMENTS 4,994,818 A * 2/1991 Keilmann ................. 343/786
5,936,237 A * 8/1999 van der Weide ........... 250/234

OTHER PUBLICATIONS

"Near-Field Antennas Integrated With Scanning Probes for THZ to visible Microscopy: Scale Modeling and Limitations on Performance" Rosner, B., Peck, J., van der Weide D., IEEE Transactions of Antennas and Propagation, vol. 50, No. 5, pp. 670 to 675, May 2002.*
"Long-Wave-Infrared Near-Field Microscopy" Keilman, F., Knoll, B., Kramer, A., Phys. Stat. Sol. (b) vol. 215, pp. 849 to 854 (1999).*
"Near-field mirowave microscope with improved sensitivity and spaial resolution", Tselev, A., Anlage, S.M., Christen, H.M., Moreland,R.L., Talanov, V.V., Schwartz, A.R., Review of Scientific Instruments vol. 74, No. 6, pp. 3167 to 3170, Jun. 2003.*
"Development of terahertz wave microscopes" Yuan,T., Xu,J.Z., Zhang, X.-C., Infrared Physics and Technology, vol. 45, pp. 417 to 425, 2004.*

* cited by examiner

*Primary Examiner*—Jack I Berman
*Assistant Examiner*—Meenakshi S Sahu
(74) *Attorney, Agent, or Firm*—Andrew Wilford

(57) ABSTRACT

The invention relates to a near-field antenna comprising a dielectric shaped body having a tip. The shaped body is characterized in that at least the surface of the tip is metallized, thereby enhancing the sensitivity of devices comprising the near-field antenna, for example, spectroscopes, microscopes or read-write heads.

8 Claims, 5 Drawing Sheets

NEAR-FIELD ANTENNA

CROSS REFERENCE TO RELATED APPLICATIONS

This application is the US national phase of PCT application PCT/EP2005/012407, filed 19 Nov. 2005, published 01 Jun. 2006 as WO 2006/056373, and claiming the priority of German patent application 102004056241.5 itself filed 22 Nov. 2004, whose entire disclosures are herewith incorporated by reference.

The invention relates to a near-field antenna.

It is known that resolution capability is limited to about half the wavelength of the medium used, e.g. light, due to the effects of diffraction.

The so-called near-field range is attained when the distance between an optical probe and the surface of a sample is smaller than the wavelength of the injected radiation. The diffraction limit can be circumvented by working in the near field, and resolution in the nanometer range can be attained.

In near-field microscopy and spectroscopy, an opening or aperture that is smaller than the wavelength scans the surface of a sample that is to be examined. An image of the sample is produced point by point. As determined by the small opening, only that part of the surface is examined that corresponds to the measurement opening and thus information is obtained only from this area.

Transferred to electromagnetic waves in general, we proceed from a suitable radiation source and a near-field antenna in order to produce a terahertz beam. Using the terahertz beam to scan, perpendicular to its direction of propagation, the sample to be examined produces location-resolved images. Each pixel generated contains spectral information.

T. Yuan, et al (T. Yuan, J. Z. Xu, X. C. Zhang, 2004, Development of Terahertz Wave Microscopes, Infrared Physics and Technology 45, 417-425) describe operating a microscope in the near-field THz frequency range in order to attain resolutions in the sub-mm range. The highest resolution of about 150 nanometers is attained with an aperture-less probe microscope in which the near field, which is generated by dispersing an incident expanded wave on a fine metal tip, is used for a location-resolving probe. Disadvantageous are extremely low signal intensities of the dispersed radiation and the fact that measurements of the phase are virtually impossible due to the periodic movement of the needle.

Known from Tselev, et al (A. Tselev, S. M. Anlage, H. N. Christen, R. L. Moreland, V. V. Talanov, A. R. Schwartz, 2003, Near-field microwave microscope with improved sensitivity and spatial resolution, Review of Scientific Instruments 74, 3167 ff.) is a microwave near-field microscope with coaxial resonator antenna. It is disadvantageous that this is not suitable for the frequency range above about 50 gigahertz (GHz) because above this frequency the wave attenuation is too severe.

The object of the invention is to provide a near-field antenna for electromagnetic waves with which waves preferably in the range of 10 GHz to 10 THz can be concentrated dispersion-free on a surface with much smaller dimensions than the wavelength.

The object is attained using a near-field antenna in accordance with the main claim. Advantageous embodiments result from the patent claims that depend from the main claim.

The near-field antenna includes a dielectric shaped body with partial metal plating. The metal plating advantageously has the effect of concentrating an electromagnetic wave, preferably in the frequency range between about 10 GHz and 10 THz, nearly dispersion-free and loss-free, on a sample surface in the micrometer range. A very high alternating electrical field is advantageously generated at the tip. Its order of magnitude results from the electrical field strength of the injected waves multiplied by the ratio of wavelength to tip dimensions (300 at 100 GHz and 10 micrometer tip dimensions). This leads to high sensitivity of the devices incorporating the near-field antenna, such as e.g. spectroscopes, microscopes, or read/write heads.

In the framework of the invention it was recognized that partial metal plating on the dielectric shaped body advantageously converts a propagating electromagnetic wave to a capacitor field at the tip of the near-field antenna, the frequency of which equals the frequency of the injected wave. This advantageously provides a probe for location-resolved measurements with electromagnetic waves, the spatial resolution of which equals the physical dimensions of the tip of the near-field antenna. Using the broad-band characteristics of the near-field antenna, this location-resolved information can contain additional spectral information, for instance using the frequency-dependence of the dielectric constants of a sample.

Using at least two metal layers that are electrically insulated from one another, for instance on two opposite sides of the dielectric shaped body, an electromagnetic wave propagating in the direction of the tip of the dielectric shaped body parallel to the longitudinal axis advantageously converts to a high-frequency capacitor field at the tip of the dielectric shaped body. The tip of the dielectric shaped body serves as a probe for location-resolved measurements with electromagnetic waves.

If the tip is brought into the immediate vicinity of a sample to be examined, after injection the wave is reflected back into the antenna from a partial volume of the sample, the dimensions of which are a function of the order of magnitude of the tip. The reflection factor is determined for this.

By analyzing amplitude and phase of a reflected or transmitted wave, location-resolved information about the qualities of the sample are obtained, especially about its dielectric properties.

Using symmetrically arranged metal plating areas that are insulated from one another and that are on the sides of the tip of the dielectric shaped body particularly advantageously ensures that the wave can propagate unimpeded up to the tip. Without metal plating, the location-resolution would be not much smaller than the wavelength, while with metal plating of the tip on all sides the wave could not propagate up to the tip. The other part of the dielectric shaped body below the tip can also have symmetrical metal plating.

In any case, the wave injected into the sample must be linearly polarized. The direction of the polarization should be perpendicular to the metal-plated surfaces of the tip so that the alternating electrical field can build up at the tip between the two layers of metal plating.

The metal plating can comprise e.g. gold, silver, or copper. The high conductivity has an advantageous effect on the sensitivity of a device that includes the near-field antenna.

The shaped body itself comprises low-loss dielectric material, in particular silicon, sapphire, or polyethylene. Silicon is suitable in particular for analyses over 100 GHz, since the lowest losses occur in this range and silicon does not exhibit any dispersion of the dielectric behavior. Sapphire is advantageous due to low losses at frequencies below 100 GHz and is also mechanically very stable. Polyethylene also has low losses. It is also economical.

In a further development of the invention, the base surface of the near-field antenna can be parallepipedal. The parallepipedal base surface is particularly advantageous because metal-plated surfaces can easily be embodied symmetrically on the shaped body. The partial metal plating can be applied for instance using thermal deposition, since in this method the sides of the antenna that are oriented parallel to the direction of flight of the metal atoms are not coated.

In a particularly advantageous embodiment of the invention, the near-field antenna has a truncated pyramid-shaped tip. In connection with a parallepipedal base surface, it is particularly advantageous that electromagnetic waves can be concentrated dispersion-free and loss-free on a sample surface having much smaller dimensions than the wavelength. The effect of the truncated pyramid is that the metal plating can be symmetrically arranged, even at the very tip of the inventive near-field antenna.

Using two metal layers that are electrically insulated from one another and that are on two opposite sides of the truncated pyramid-like tip of the dielectric shaped body, the electromagnetic wave propagating along the axis of symmetry of the truncated pyramid is converted to the above-described high-frequency capacitor field at the tip of the truncated pyramid.

However, in the framework of the invention it is also conceivable to provide other geometries for the near-field antenna if symmetrical layers of metal can be provided on its tip. It is conceivable to provide e.g. a cylindrical geometry having an elliptical or circular cross-section and a corresponding conical tip that has the symmetrical metal plating.

The near-field antenna can be inventively coupled to a dielectric waveguide. An air gap can be provided between the near-field antenna and the dielectric waveguide. The near-field antenna can also be coupled to a waveguide. In these cases, the entire antenna forms a dielectric resonator whose properties, such as e.g. resonance frequency and quality, are changed by the sample to be examined that is in front of the tip. This enables particularly sensitive phase measurements that in the expected resonator qualities of 1000 are more sensitive by a factor of 1000 compared to a non-resonant arrangement.

The metal plating of the tips can advantageously occur with a conventional high-vacuum deposition system. When the geometry of the tip of the near-field antenna is a truncated pyramid, the sides to be coated are coated perpendicular to the movement direction of the particles in the deposition system. Any remaining thin metal layers on the sides of the truncated pyramid that are not to be coated can be removed e.g. with ion-beam etching.

The diameter of the tip at its smallest location relative to its base surface is advantageously less than one micrometer, e.g. about 50 nanometers.

This latter shape can be attained e.g. with focused ion beam machining (VIB). The particularly advantageous effect of this is that information of nano-scale pixels can be read out extremely rapidly with cycle frequencies up to terahertz frequencies. In this context it is conceivable, due to the high field strengths on the end of the tip, which are produced by the generated alternating field, on the order of magnitude of up to $10^8$ V/m, to inscribe in ferroelectric layers such as e.g. barium-strontium-titanate, nanometer-scale domains with permanent polarization. Reading the nanopixels out is done e.g. using a change in the reflection factor of the THz wave in areas with inscribed remnant electrical polarization. Thus the near-field antenna functions as a read/write head for e.g. ferroelectric fixed disks. The transferred data rates are in the range of gigabit/sec, and are thus clearly higher than those of conventional fixed disks. Also conceivable as storage media are bistable molecules that exist in two different conformations. In this case, terahertz radiation can be used to induce transition between two states. For the necessary rapid measurements of the amplitude changes in the reflected terahertz wave, e.g. superconducting Josephson contacts can be used. Like a fixed plate, the planar storage medium rotates under the inventive near-field antenna.

In the following the invention will be described in greater detail using illustrated embodiments and the attached figures.

Figure 1:
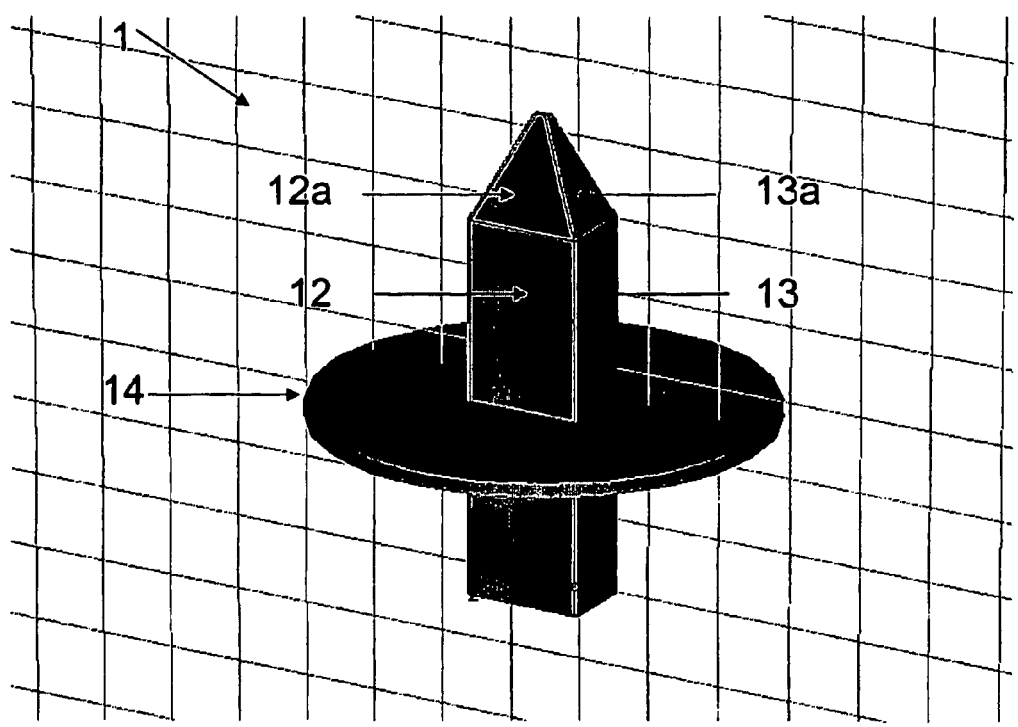
FIG. 1 is a schematic view of the inventive near-field antenna.

In accordance with FIG. 1, a near-field antenna 1 has a dielectric shaped body made of a rectangular shaped block with the sides 12, 13. The shaped body comprises dielectric material, e.g. silicon, sapphire, or polyethylene.

At one end the shaped body has a truncated pyramid-shaped tip with surfaces 12a and 13a. On the surface 13a and the surface opposite this surface the tip is metal-plated with e.g. gold, silver, or copper, at least in the area of the tip. In addition to the surface 13a, then, the surface opposite this surface is also metal-plated. In this manner the metal plating is done symmetrically. The surface 12a and the surface opposite this surface are not metal-plated.

The dielectric shaped body is also metal-plated at the surface 13 and at the surface opposite this surface. Again, the surface 12 and the surface opposite this surface are not metal-plated.

The electromagnetic wave is fed into the near-field antenna 1 from the flat side. To this end, a planar wave is focused on the surface opposite the tip. The dimensions of this surface should be at least as large as the beam diameter, that is, a few wavelengths in size.

The tip of the near-field antenna 1 is thus embodied by the surfaces 12a and 13a and the surfaces opposite these surfaces as a truncated pyramid. The tip is flattened at its free end. This creates the effect that the high-frequency capacitor field generated is very homogeneous, which is advantageous for the attainable spatial resolution.

A round mount 14 made of metal or another low-loss dielectric substance, e.g. Teflon in the case of a silicon tip, is used to install the near-field antenna in an arrangement for spectroscopy or microscopy or for a read/write head. The dielectric constant of the mount is preferably lower than the material of the near-field antenna by at least a factor of two.

The electromagnetic wave entering the near-field antenna via a dielectric waveguide initially excites the base mode. It is known that this mode does not have any lower limiting frequency, so that after entering the near-field antenna the wave can propagate through the narrowing cross-section up to the tip. At a small enough angle, depending on the refraction index of the material used, and given the pitch of the truncated pyramid, based on the interior total reflection the wave cannot exit via the non-metallic sides. Thus the dielectric waveguide mode, across the length of the truncated pyramid, gradually converts to a wave type that corresponds to a line. This means that the electromagnetic fields are guided between the two metal layers. This continuous conversion of the wave type occurs without noticeable dispersion and attenuation across a very wide frequency range from at least 10 GHz to 10 THz. The pyramid shape of the tip is also responsible for the fact that the wave impedance is constant in the area of the tip. Because of this, the desired spatially highly limited alternating field is generated at the tip across a wide frequency range using the injected wave.

Figure 2:
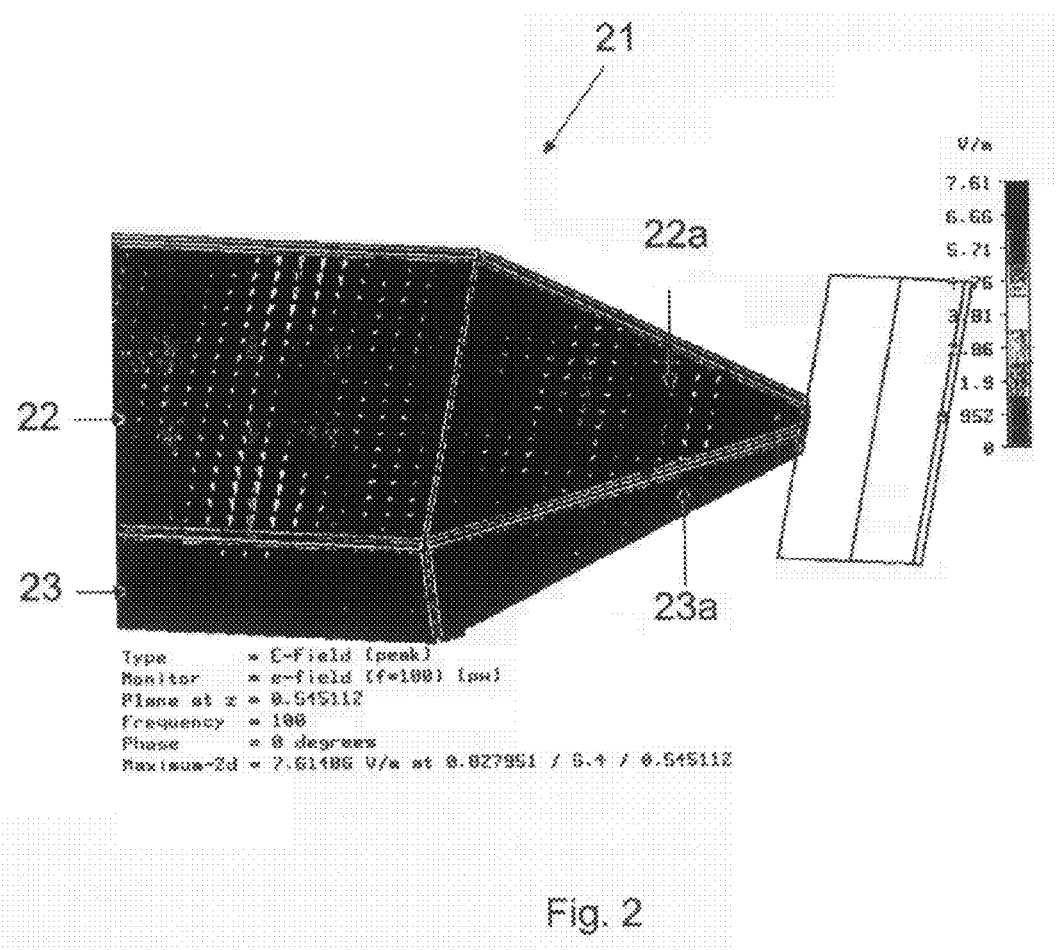
FIG. 2 shows the distribution of the electrical field on the inventive near-field antenna.

FIG. 2 depicts the calculated distribution of the electrical field at the tip 22a and 23a of the near-field antenna 21. After the wave has been injected and conducted further, a high-frequency, spatially highly concentrated alternating field, similar to that of a plate capacitor, occurs at the end of the truncated pyramid, as can be seen from the calculated field distribution in accordance with FIG. 2. The spatial expansion of the high-frequency alternating field and of the tip define the spatial resolution the probe can attain. The stray field of the, capacitor passes through the sample, which is located directly in front of the probe, and thus represents a sensitive probe. If a sample with spatially varying dielectric or metallic properties is brought into the vicinity of the near-field antenna 1 or 21, the amplitudes and phases of the wave reflected or radiated back from the tip change. These can be detected as measurement signals using appropriate detectors for the frequency range, e.g. by means of Schottky diodes up to approx. 200 GHz.

FIG. 2 depicts the calculated distribution of the electrical field for a frequency of 100 GHz. It is clear that the wave expands up to the tip of the pyramid. In the near-field antenna illustrated in FIG. 2, the dimensions of the tip are approx. 100 micrometers edge length at a wavelength of 3 mm at 100 GHz. On the right-hand side in FIG. 2, the high-frequency capacitor stray field is indicated as an arrow to the right of the tip, representing the actual probe for location-resolved measurements.

Figure 3:
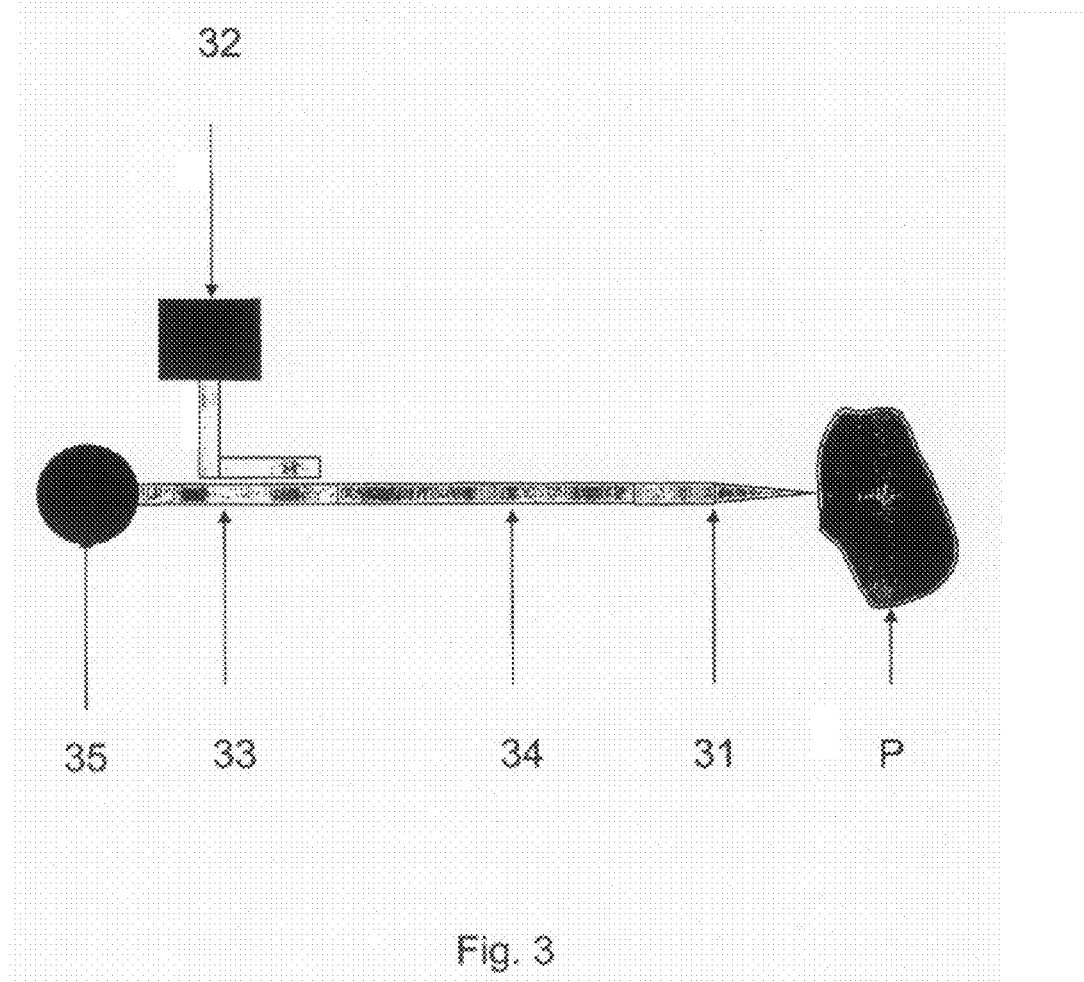
FIGS. 3 through 5 are top views of three inventive near-field antennas and their arrangements in devices for near-field microscopy and near-field spectroscopy.

In accordance with FIG. 3, the monochromatic wave exiting from a millimeter-wave source 35, e.g. a Gunn oscillator or a backward wave oscillator, is injected through a directional coupler 33, through which the wave reflected by the sample P is conducted to a detector diode 32, through a flexible dielectric waveguide 34 into the inventive near-field antenna 31. The waveguide 34 and the near-field antenna 31 can be produced from one piece of e.g. high-density polyethylene.

Alternatively, it is possible to leave an air gap the size of less than half a wavelength, that is for instance 1 mm at 100 GHz, between the antenna 31 and the waveguide 34. The antenna 31 is made of a low-loss dielectric material such as e.g. sapphire and forms a high-quality dielectric resonator through which the changes in the resonance frequency and quality caused by the sample P are detectable using the measurement of the reflected signal.

The device in accordance with FIG. 3 is suitable for in vivo applications in dermatology, e.g. for early detection of skin cancer, while the frequencies with different absorptions for water are compared with one another. Due to the mechanically flexible waveguide it is also possible to use this measurement device orally.

Figure 4:
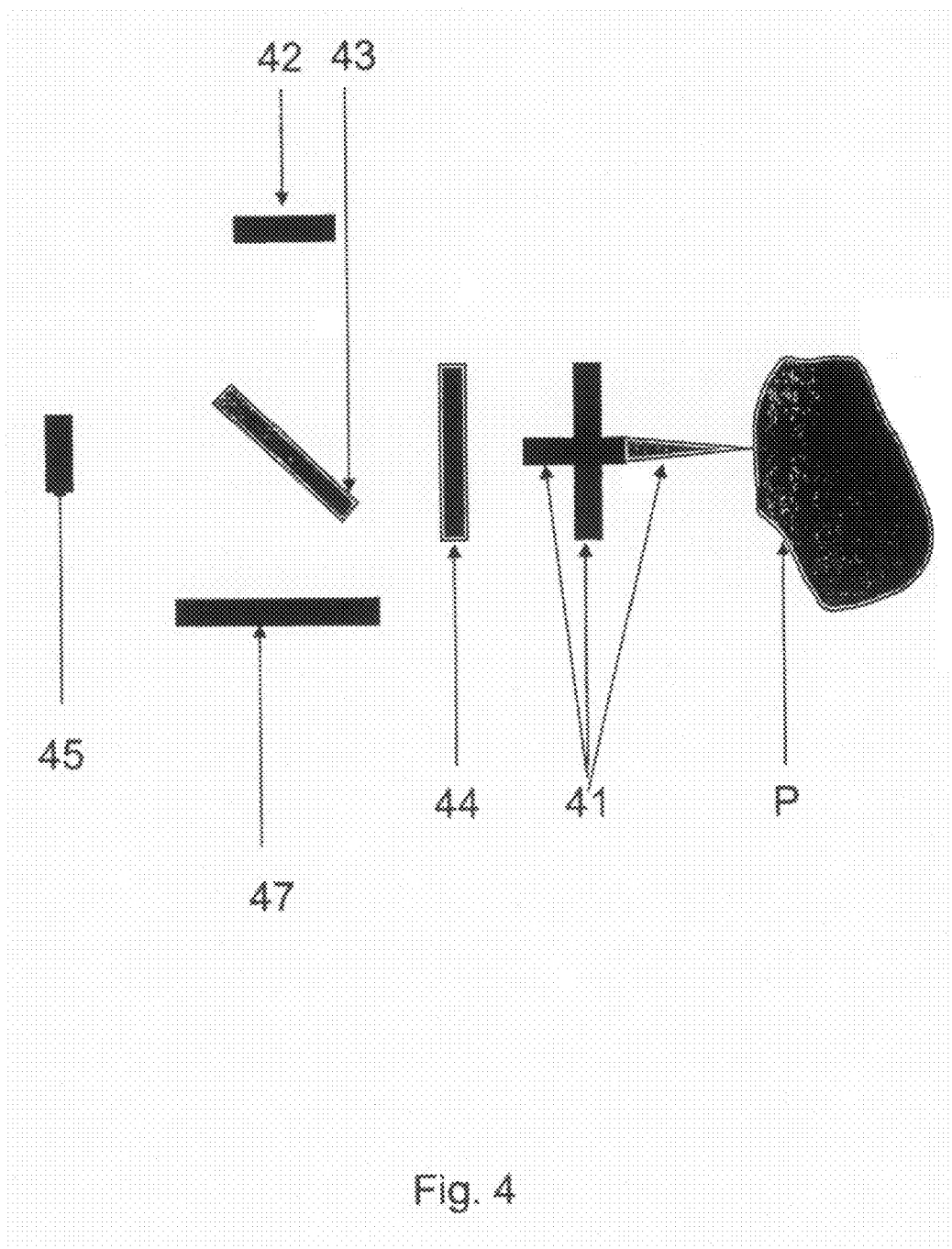
Figure 5:
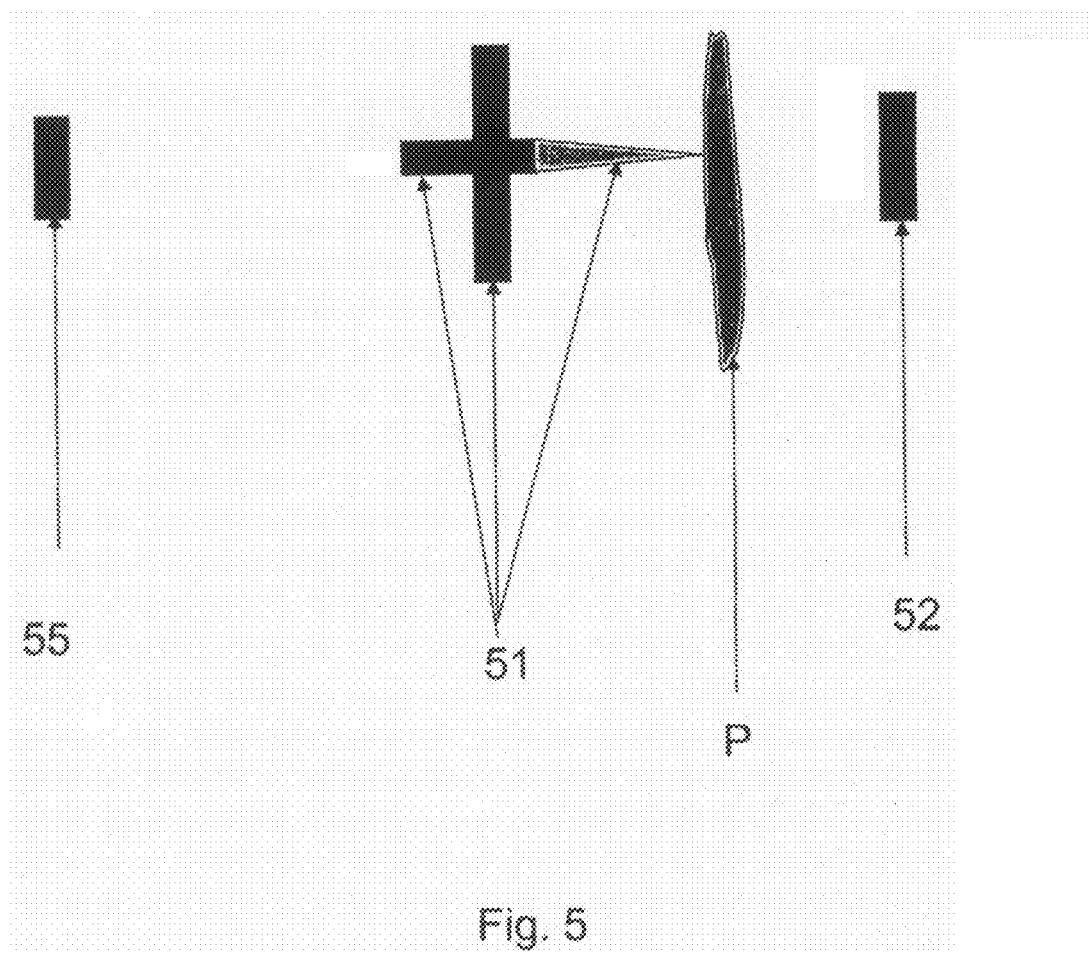

The near-field antennas 41 and 51 illustrated in FIGS. 4 and 5 each include a tip, a dielectric shaped body, and a mount, as shown in FIG. 1.

FIG. 4 illustrates one possible arrangement for location-resolved terahertz near-field spectroscopy based on picosecond time-domain spectroscopy. The electrical impulse generated by a femtosecond laser pulse at the emitter 45 with a time duration of approx. one picosecond is focused as a freely propagating wave by mirrors or lenses (not shown) on the flat back side of the antenna 41. Provided as material for the inventive near-field antenna 41 is high-ohmic silicon that has low losses and practically no dispersion in the terahertz range. Due to its anisotropic etching behavior, silicon is particularly suitable for producing tips with dimensions in the sub-micrometer range. The signal reflected by the sample P is injected into the detector 42 via a partially reflecting mirror or a wire polarization filter 43 that is tilted 45° to the wave propagation direction. In the case of the wire polarization filter 43, a second polarization filter 44 for suppressing the excitation of modes with false polarization is advantageous. An additional absorber 47 can be used for preventing echo signals through parasitic propagation paths. Spectrally, resolved images are obtained by scanning the sample P, which is arranged in front of the antenna type 41 at a distance that is smaller than the dimensions of the tip in the direction perpendicular to the direction of propagation. Alternatively, the antenna can be moved if the sample is fixed.

As one possible application, e.g. microelectronic switching circuits can be examined using such a method.

Additional depth information is found by measuring the change in the impulse shape of the picosecond impulse, based in part on multiple reflections in the sample. It is important for such measurements that the dispersion of the picosecond impulse after passing through the inventive antenna is very low.

In the arrangement depicted in FIG. 5, the detector 52 is oriented behind the sample P. This is how the signal transmitted through the sample is detected. This arrangement offers high sensitivity for very thin transparent samples, and is suitable for terahertz spectroscopy on individual biological cells if they can be placed immediately in front of the tip, e.g. using a pipette that is placed in the immediate vicinity of the tip using micromanipulators.

For the above-described embodiments, for improving the, injection into the near-field antenna of an electromagnetic wave that propagates freely in space, a hemispherical lens can be arranged in front of the near-field antenna such that the planar back side of the antenna is disposed on the planar surface of the hemispherical lens. The latter should comprise a material with a dielectric constant that is as close as possible to that of the near-field antenna.

Another possible use of the inventive near-field antenna is the location-resolved determination dielectric losses in the millimeter-wave range of diamond windows that are provided for millimeter-wave plasma heating in future fusion reactors.

Another use is comprised in the possibility for location-resolved measurement of the dielectric constants and dielectric losses during wafer inspection and semiconductor production and for examining doping profiles and surface doping, and also for inspecting gate oxide layers of CMOS transistors.

Another use is comprised in the area of ceramic materials (piezoelectric items, ferroelectric items) in location-resolved measurements with respect to the differentiation of intergranular and intragranular properties. This applies both to bulk materials and to coatings.

The invention claimed is:

1. A near-field probe, including a dielectric shaped body having a tip having opposite electrically insulated sides that are metal-plated wherein the tip is frustopyramidal.

2. The near-field probe in accordance with claim 1 wherein the metal plating is symmetrical.

3. The near-field probe in accordance with claim 1 wherein the dielectric shaped body is of parallelepipedal shape.

4. The near-field probe in accordance with claim 1 wherein the dielectric shaped body is of high-ohmage silicon, sapphire, or polyethylene.

5. The near-field probe in accordance with claim 1 wherein the plating is of gold, silver, or copper.

6. The near-field probe in accordance with claim 1 wherein the achievable spatial resolution corresponds to the physical dimensions of the tip of the near-field probe.

7. A spectroscope, microscope, or read/write head, including a near-field probe in accordance with claim 1.

8. Use of a near-field probe according to claim 1 in a frequency range preferably between 10 gHz and 10 THZ.

* * * * *